UNITED STATES PATENT OFFICE.

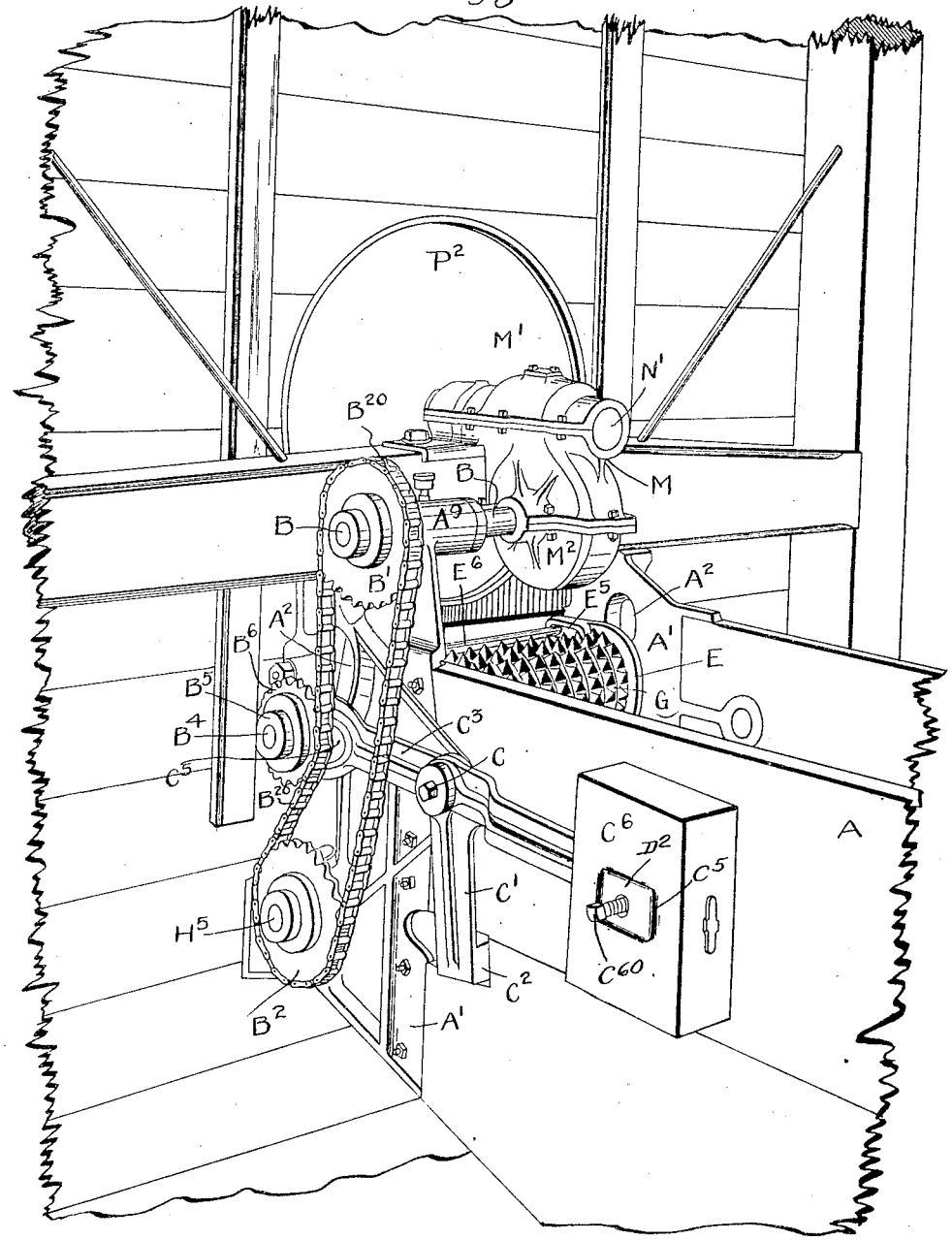

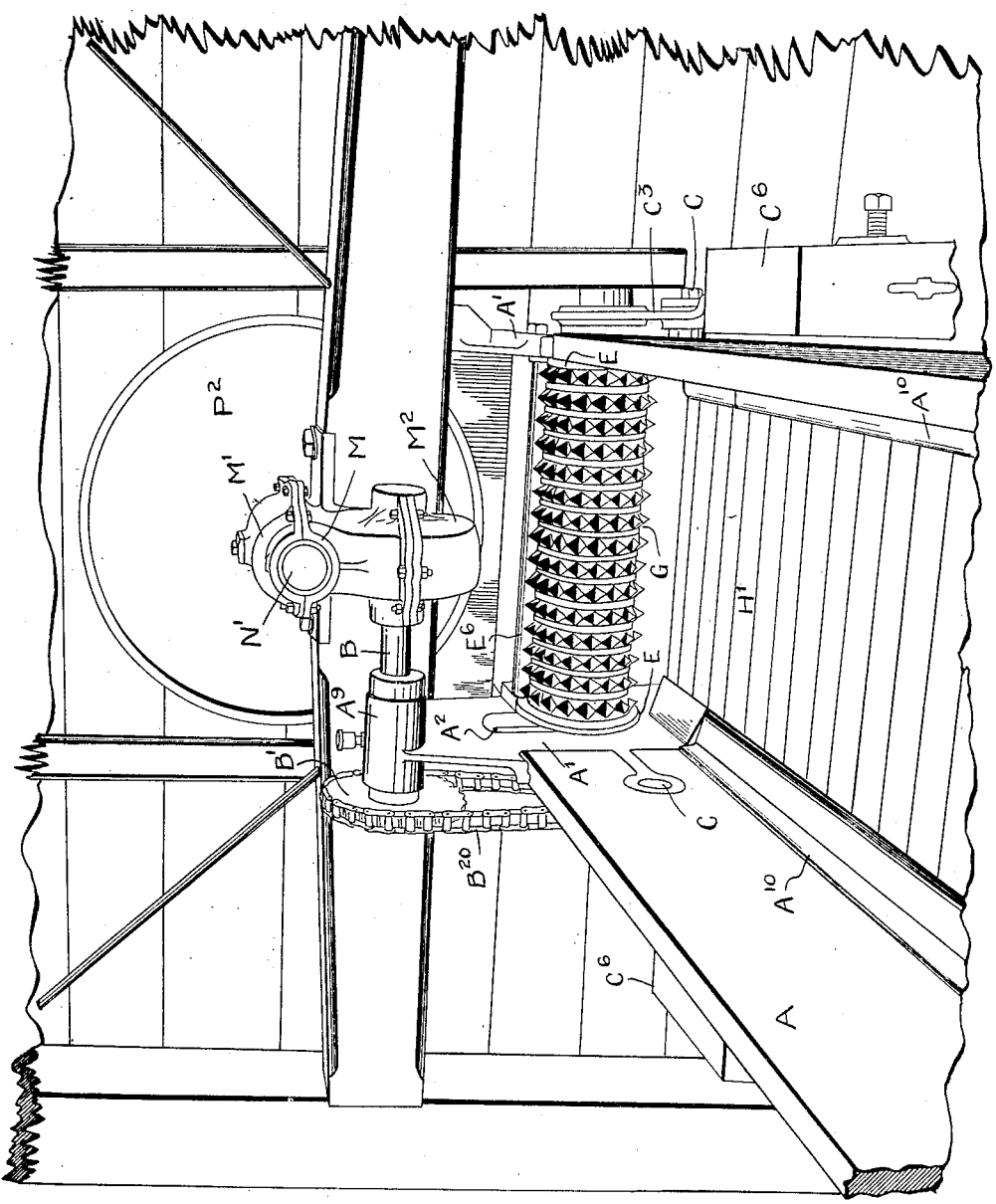

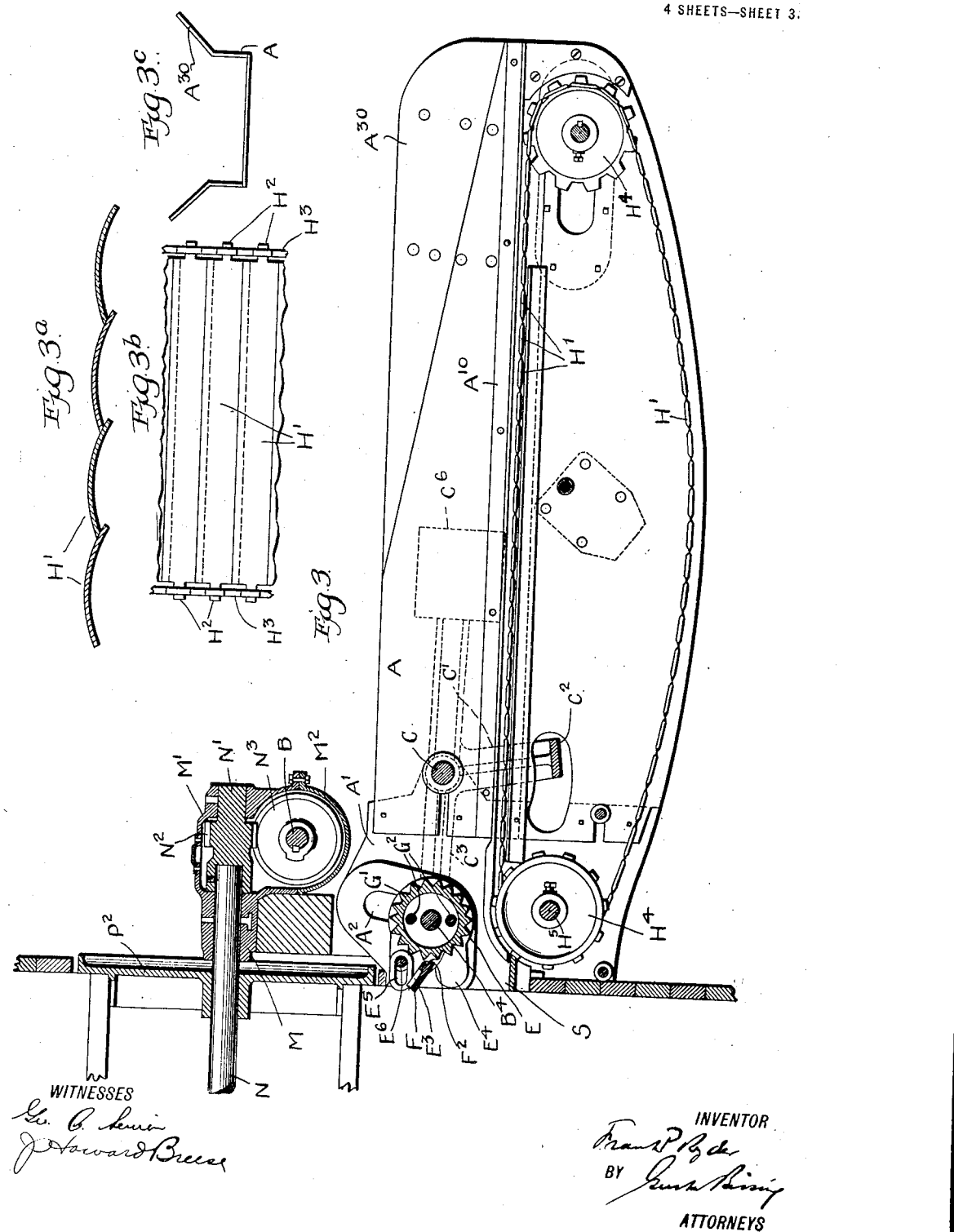

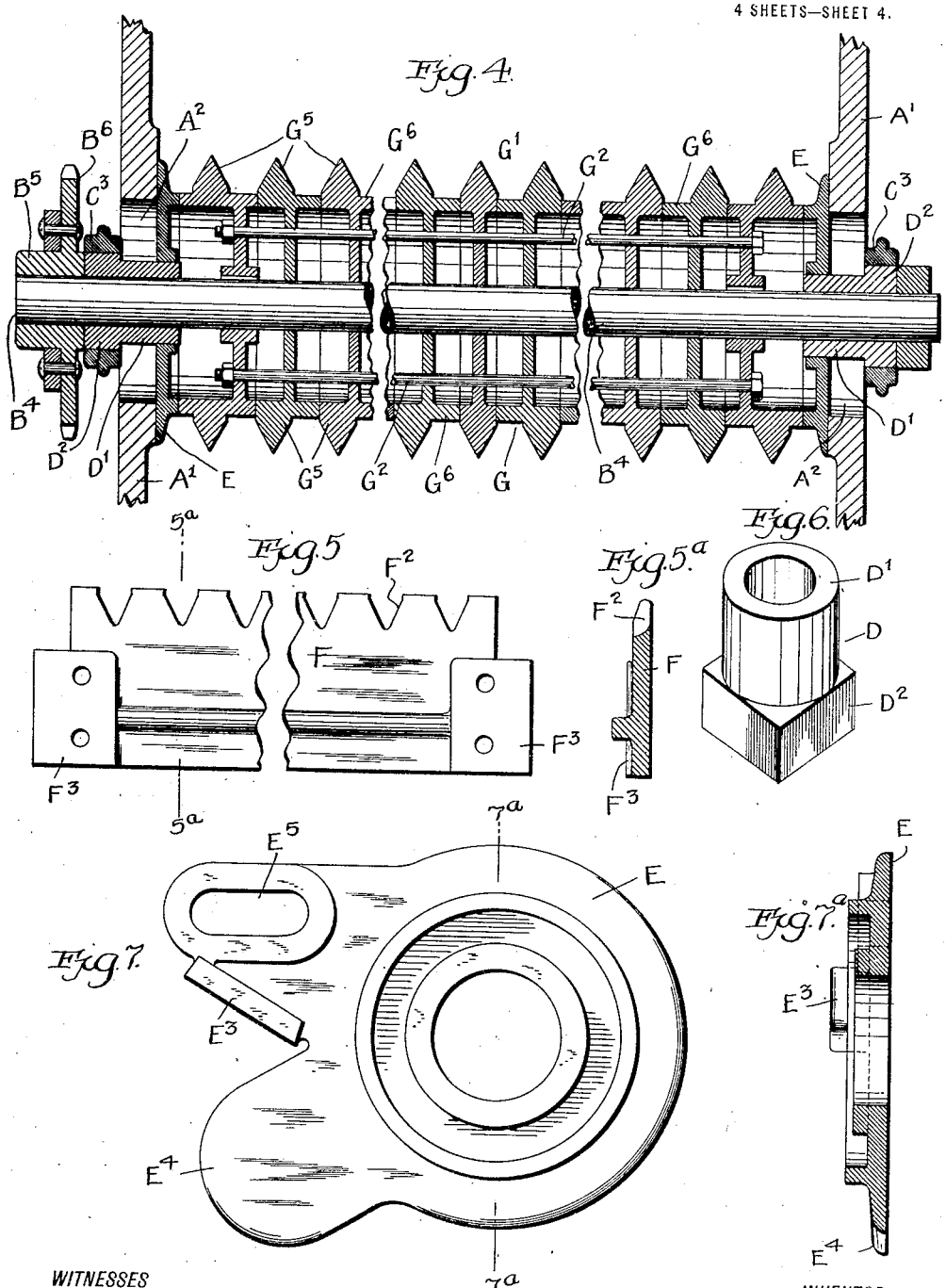

FRANK PETTIS RYDER, OF SUSPENSION BRIDGE, NEW YORK.

GREEN-PEA-VINE FEEDER.

1,331,278.　　　　Specification of Letters Patent.　　Patented Feb. 17, 1920.

Application filed May 1, 1916. Serial No. 94,853.

*To all whom it may concern:*

Be it known that I, FRANK PETTIS RYDER, a citizen of the United States, and resident of Suspension Bridge, Niagara county, New York, have invented new and useful Improvements in Green-Pea-Vine Feeders, of which the following is a specification.

My invention lies in an apparatus for feeding green pea vines, as they come from the field, to a machine for hulling the peas thereon, which is commonly called a viner. Such viners are *sui generis* in this that although it is easy to completely hull all the green peas fed into the machine by choosing a sufficiently high speed of rotation for the beaters which do the hulling, just as in the case of dry grains, it is difficult to open an adequate percentage of pods at the comparatively low beater speeds which are necessary to prevent splitting the hulled pea berries, the problem of splitting not arising in the case of dry grains which are usually hard and tough. Yet the trade demands a minimum of split peas and pays the highest prices for peas which are not split.

The feeding devices for viners now on the market employ conveyers having fingers to positively carry the bunches of vines into proximity to the feed hole. These fingers are however withdrawn from the vines before these reach the feeding aperture and, in fact, the arrangement is such that each bunch of vines is really caused to pass through the feed hole by the push of the following bunch so that, at the close of the operation, the final bunch is found on the feeder and not within the viner. When a part of a bunch of vines has passed well through the feeding aperture, it is at once struck by a passing revolving beater which causes the rest of the bunch to be violently drawn, pulled or jerked into the hulling apparatus and the operation of feeding, for that bunch, is thus completed. The action of drawing or jerking the bunches of vines into the viner by the revolving beaters is however not retarded or resisted by the feeding fingers which have been previously withdrawn from the vines under consideration.

In my invention, I employ a feeding device, specifically considered a toothed roll, which pushes the vines through the feed hole into the viner at a given speed which is less than that at which the moving beaters tend to draw or jerk the vines into the machine. In consequence the toothed roll acts not merely as a feeder but also as a retarder, its teeth holding the vines back against the pull of the beaters, thus stringing out the vines. This attenuation of the bunches of vines makes it possible for the various beaters in the hulling machine to open the pods at a lower beater speed because they are more likely to hit a large proportion of the pods directly instead of having their blows transmitted to the pods through a covering of vines, as would be the case if the vines were not strung out, thus wasting part of the force of the blow. In other words if large bunches of vines are fed into the machine and this in compact masses, high beater speeds are necessary because most of the pods are struck when covered by vines which means that such pods as are directly struck will have their contained berries damaged. That is why feeding in a strung out or attenuated distribution is desirable.

I arrange my feeding retarder to ride up and down or to float on and engage the stream of vines which are supplied to it by the conveyer which I employ, irrespective of the thickness of the stream and in order that there may be no undue compression of the vines, which would compact and mat them and render them more difficult for attenuation and subsequent hulling, I counterweight the device so that its full gravity-pressure does not bear downward upon them.

The conveyer which I employ to pass the vines to the feeding-retarder differs from those now in use in this specific art in this whereas positively-acting fingers have heretofore been employed, I dispense with the fingers and rely on the friction of the conveyer plates against the superincumbent vines. In consequence, when the operator who passes the vines from the wagon load which comes from the field forks them onto my conveyer in heavy bunches instead of in a steady stream of lighter bunches, the conveyer keeps on moving but is unable to drag the vines with it. The operator is thus compelled to feed smaller fork-fulls at more regular intervals which makes it possible for the feeding-retarder to string out the vines in a mat which is so thin that the efficient hulling of the pods at low speeds is possible.

In the drawings:

Figure 1 is a perspective view of my feeder from the side.

Fig. 2 is a perspective view of the same from the front.

Fig. 3 is a longitudinal cross section.

Figs. $3^a$, $3^b$ and $3^c$ are details of the conveyer.

Fig. 4 is a longitudinal section of the toothed feed roll.

Fig. 5 is a plan of stripper.

Fig. $5^a$ is a cross section thereof.

Fig. 6 is a perspective of a bushing.

Fig. 7 is a plan of the stripper support, and

Fig. $7^a$ is a cross section thereof.

Examining Fig. 1, we find shown the feed end of an ordinary green pea viner, which needs no further description, it being merely necessary to note that the head $P^2$ of the beater-carrying cylinder rotates in an aperture in this end frame. The power shaft N of the viner, which drives the beater-carrying cylinder, is mounted in a boxing M to which is secured a housing constituted in part by a lower cap plate $M^2$ and an upper cap plate $M^1$. To the end of the shaft N is secured a part $N^1$ (Fig. 3) carrying a spiral gear $N^2$ which meshes with another spiral gear $N^3$ keyed to a shaft B which is the power transmitting shaft for driving the feeder.

It will be observed from Fig. 1 that this power transmitting shaft B which is supported at $A^9$ has mounted thereon a sprocket wheel $B^1$ which carries a sprocket chain $B^{20}$ which passes around a sprocket wheel $B^2$ driving a shaft $H^5$. The floating sprocket wheel $B^6$ which is secured to a boss $B^5$ (Fig. 4) meshes with the sprocket chain $B^{20}$, thus communicating motion to the shaft $B^4$ on which the sprocket $B^6$ is mounted. This shaft $B^4$ which is the driving shaft for the toothed feed roll G has mounted on each end thereof a two-part bushing D as appears from Figs. 4 and 6, the square part $D^2$ sliding in a slot $C^5$ in the arm $C^3$ pivoted at C and the round part $D^1$ of the bushing moving in a slot $A^2$ of the metal plate $A^1$ which forms one side of the end of the feed trough A. It will be observed that the arm $C^3$ which is pivoted at C carries an arm $C^1$ with a cross bar $C^2$ connecting it to similar parts on the other side of the feed trough and that this arm $C^3$ is supplied with a sliding counterweight $C^6$ held in place by a screw $C^{60}$.

It follows, then, that as the toothed feed roll (Fig. 2) moves up and down because of the various thicknesses of the bunches of vines which pass beneath it, that the shaft $B^4$ (Fig. 1) also rises and falls which means that the cylindrical part, $D^1$ of the bushing D, moves up and down in the slot $A^2$ at the same time that the square part of the bushing $D^2$ moves back and forth in the slot $C^5$. I may say that I make the slot $A^2$ of such a shape that the sprocket wheel $B^6$ moves inward against the sprocket chain $B^{20}$ by just the right amount to keep that chain at a uniform tension, no matter whether the sprocket wheel is at the top, when the roller G is high, or is at the bottom, when this roller G is low. I conclude with the remark that the shape of the slot $A^2$ can be worked out mathematically but that it is easier to determine it by laying it out or plotting it from a specimen piece of apparatus.

I now come to describe the specific construction of the toothed feed roller. It is seen to consist of a number of disks $G^5$ having laterally extending flanges $G^6$ on one side thereof. In this manner, it is possible to use a single casting for all the disks for those on the right-hand side of Fig. 4 are the same as those on the left-hand side of this figure in a reversed position. The central disk $G^1$ without flanges is, however, necessary for symmetry. These various disks are held together by brace rods $G^2$ and are splined to the shaft $B^4$ through their central collars in a manner readily understood.

I now come to describe the stripping device which I employ in connection with the toothed roller in order to clear this roller of any vines which may happen to stick to it or become entangled with it. The stripper, itself, is shown in Fig. 5 and consists merely of a plate F having a serrated edge $F^2$ of a shape to fit the teeth of the roller and their interspaces and apertured securing bosses $F^3$. End supports for this plate are found in the disks E shown in detail in Figs. 7 and $7^a$ and in position in Fig. 4 at each end of the shaft $B^4$ being mounted upon the cylindrical portion of the bushing D. The disks E have each an elongated slot $E^5$ through which passes a rod $E^6$ bolting together the metal plates $A^1$ at the ends of the feed trough (Figs. 1, 2, 3). The disks E have also shoulders $E^3$ to which are secured the bosses $F^3$ of the stripper F.

It is thus immediately clear that as the toothed roller G rises and falls, the disks E rise and fall with the roller, which means that the stripping supports $E^3$ and the stripper F do the same thing, as a consequence of which the stripper is always maintained in the same spatial relation to the floating toothed roll. It is also now clear why the slot $E^5$ of the plate E is elongated for since the toothed roll rises and falls in a given path which is not circular, it is necessary for the disks E to move in a similar non-circular path, which means that the part of the disk at $E^5$ does not remain stationary, which predicates a slot as necessary to accommodate the motion with relation to the stationary rod $E^6$ at this point. Finally, there is at an ear $E^4$ cast integral with the disk E which has the function of covering the lower part of the slot $A^2$ when the toothed roll G rises toward its top and thus preventing the escape of vines through an uncovered opening in the sides of the feed trough.

I now come to a description of the conveyer which presents the vines to the toothed feed roll. The sides of this conveyer trough are shown in Fig. 3 and the metal ends $A^1$ which are shown in Fig. 2 have already been referred to. The conveyer, itself, is made of a series of curved slats $H^1$ which overlap and which have ears $H^2$ at the ends secured to sprocket chains $H^3$, all of which is shown in Figs. $3^a$ and $3^b$. These sprocket chains and ears $H^2$ are, however, covered by the angle irons $A^{10}$ well shown in Fig. 2, which prevent the vines from becoming entangled with the chains. I have not attempted to show the rounded character of the slats $H^1$ in Fig. 3 since the scale is too small, relying instead on Fig. $3^a$.

It will be seen that these slats feed the pea vines in a frictional way and thus substitute a friction conveyer instead of the positive feed or tooth conveyer heretofore common in this class of apparatus.

In order to drive this conveyer, I use sprocket wheels $H^4$, the pair of sprockets near the feed end being driven by the shaft $H^5$ which gets its power from the sprocket chain $B^{20}$ already described. Nor need I go into detail to describe the mechanism for tightening this conveyer by the use of the ordinary adjusting slot for the sprocket wheel, since such devices are common. I note in conclusion that while the sides of my conveyer trough $A^{30}$ are beveled outwardly at the right of Fig. 3 as seen more clearly in Fig. $3^c$, they are vertical closer in toward the feed hole. As a result, all the weight of the vines rests upon the carrier slats $H^1$, which is important in a friction feed conveyer.

A few words only will be needed to understand the operation. Small bunches of green pea vines being thrown upon the conveyer in succession, the slats $H^1$ gradually transport these bunches until they come under the toothed feed roller G. The teeth on this roller engage the vines and move them toward, into and through the feed aperture of the viner, shown at S in Fig. 3. Once well inside the feed hole, they are engaged by the rapidly revolving beaters and jerked into the machine at a speed greater than that at which they are fed by the toothed roll. As a consequence, each and every bunch of vines is attenuated, drawn out or thinned in the process of getting into the machine. If a thick bunch of vines comes along, the feed roll rises and its stripper rises with it in the manner above explained. Since this feed roll is adjustably counterweighted, it can be made to exert just enough pressure on the vines to cause a proper feed without causing so much pressure as to unduly consolidate the bunches.

Finally I note that if the operator who is using the pitch fork to throw bunches of green pea vines onto the conveyer throws any which are too large, the conveyer slats will move along without dragging such masses of vines with them whereupon the operator will naturally thin out the bunches of vines already fed to the conveyer and be more careful to feed only small bunches thereafter.

I claim:

1. The combination of a green pea viner which pulls the vines into the viner at a given speed and a feeding retarder at its feed hole which presents the vines at a less speed, thus stringing out the vines, substantially as described.

2. The combination of a green pea viner acting to pull the vines into the viner at a given speed and a toothed feeding and retarding roll arranged for juxtaposition to the viner's feed hole, which presents the vines at a less speed, substantially as described.

3. The combination of a green pea viner whose beaters pull the vines into the viner at a given speed and a green pea vine feeder comprising a floating toothed roll for presenting the vines at a less speed, substantially as described.

4. The combination of a green pea viner, a feeding-retarder and a friction conveyer to pass the vines to the feeding retarder, substantially as described.

5. A green pea vine feeder comprising a floating feed roll and sprocket, a two part bushing for its shaft, a pair of stationary sprocket wheels carrying a sprocket chain upon which the floating sprocket rides, a pivoted, counterweighted, slotted arm and a stationary plate having a tensioning slot, one part of the bushing sliding in the slot of the arm, the other in the tensioning slot of the plate to keep the chain taut in all positions of flotation, substantially as described.

6. A green pea vine feeder comprising a floating toothed roll, a pair of supporting disks non-revolubly mounted at opposite sides on its shaft and a stripper for the teeth mounted on the two supporting disks, substantially as described.

7. A green pea vine feeder comprising a floating feed roll, a boxing for its shaft, a plate having a slot in which the boxing moves, a pair of disks non-revolubly mounted at opposite sides on its shaft, and ears on the disks for covering the slots, substantially as described.

In testimony whereof, I have signed my name to this specification, in the presence of two subscribing witnesses.

FRANK PETTIS RYDER.

Witnesses:
W. L. GELLING,
J. R. BLANSHARD.